United States Patent [19]
Taniguchi

[11] Patent Number: 5,121,116
[45] Date of Patent: Jun. 9, 1992

[54] ABSOLUTE POSITION ENCODER

[75] Inventor: Mitsuyuki Taniguchi, Yamanashi, Japan

[73] Assignee: Fanuc Ltd., Minamitsuru, Japan

[21] Appl. No.: 459,840

[22] PCT Filed: May 22, 1989

[86] PCT No.: PCT/JP89/00506
§ 371 Date: Jan. 26, 1990
§ 102(e) Date: Jan. 26, 1990

[87] PCT Pub. No.: WO89/12213
PCT Pub. Date: Dec. 14, 1989

[30] Foreign Application Priority Data
May 30, 1988 [JP] Japan .................... 63-132144

[51] Int. Cl.⁵ ............................ H03M 1/22
[52] U.S. Cl. ............................ 341/116; 341/113
[58] Field of Search ............ 341/116, 118, 13, 15, 341/9

[56] References Cited
U.S. PATENT DOCUMENTS

| | | | |
|---|---|---|---|
| 3,816,825 | 6/1974 | Kaneko et al. | 341/163 X |
| 4,445,110 | 4/1984 | Breslow | 341/13 X |
| 4,524,347 | 6/1985 | Rogers | 341/13 X |
| 4,786,891 | 11/1988 | Ueda et al. | 341/13 |
| 4,998,105 | 3/1991 | Takekoshi et al. | 341/13 |

Primary Examiner—Sharon D. Logan
Attorney, Agent, or Firm—Staas & Halsey

[57] ABSTRACT

An absolute position encoder for detecting the position of a moving object includes a coding part attached to the moving object which receives sinusoidal and cosinusoidal signals through channels. Each channel receiving signals having a different number of cycles from the other channels per unit of movement of the object. The signals received by each channel are converted to digital form by an analog to digital (AD) converter and stored in a ROM. Discrepancies between the sinusoidal and cosinusoidal phase are corrected digitally by comparing the digital results of the channels, adjusting the data from higher-order channels to conform to that of adjacent lower-order channels, and finally combining the data for each channel to obtain the absolute position of the moving object.

11 Claims, 4 Drawing Sheets

ABSOLUTE POSITION ENCODER

BACKGROUND OF THE INVENTION

Field of the Invention

This invention relates to an absolute position encoder and, more particularly, to an absolute position encoder capable of detecting, as an absolute position, the rotational position of a rotary shaft of a motor or the like which drives a machine tool, etc.

Description of the Related Art

In general, an absolute position encoder has a rotary coding disk fixed to a rotary shaft and a plurality of slit arrays (channels) in accordance with binary notation or Gray binary notation provided in conformity with the resolution desired, and the rotational position of the rotary coding disk is detected as an absolute position by detecting, by means of a light-receiving element (photoelectric transducer element) an amount of light from a light-emitting element that has passed through each channel formed in the rotary coding disk and a stationary slit opposing each channel.

In order to increase detecting precision (resolution), it is necessary to increase the number of channels. For example, in order to detect angular information in which one revolution is divided into 4096, i.e., $2^{12}$, parts, it is required that the number of channels be 12 (a 12-bit code is necessary), thus necessitating a coding disk of a correspondingly large size.

In order to avoid this problem, it has been considered to provide the rotary coding disk with sinusoidal patterns in a plurality of channels so as to obtain a plurality of sinusoidal outputs having different cycles per revolution (e.g., a pattern through which one cycle of a sinusoidal output is obtained per revolution is provided as a first channel, a pattern through which 16 cycles of a sinusoidal output is obtained per revolution is provided as a second channel, and a pattern through which 256 cycles of a sinusoidal output is obtained per revolution is provided as a third channel), interpolate the angular information in one wavelength of each channel 16 items at a time, and successively combine the interpolated data of each channel thus obtained, whereby the rotational position of the coding disk is detected as an absolute position.

In such a case, the number of channels for obtaining the same resolution is smaller than that needed in a case where the channels are formed in accordance with the above-mentioned binary methods (e.g., in order to perform detection by dividing one revolution into $2^{12}$ parts, three channels will suffice, as set forth above), thereby making it possible to reduce the size of the rotary coding disk.

FIG. 2 exemplifies an absolute position encoder adapted to detect the angular information of such a rotary coding disk, in which the rotary disk used has plural channels of sinusoidal patterns the numbers of cycles whereof differ. FIG. 2 illustrates a case in which, in addition to the above-mentioned first, second and third channels (represented by $1\lambda$, $16\lambda$ and $256\lambda$, respectively), there is provided a fourth channel (represented by $4096\lambda$, by which a sinusoidal output of 4096 cycles is obtained), wherein the inputs are sinusoidal signals $1\lambda\sin$, $16\lambda\sin$, $256\lambda\sin$ and $4096\lambda\sin$ from the respective channels and cosinusoidal signals $1\lambda\cos$, $16\lambda\cos$, $256\lambda\cos$ and $4096\lambda\cos$ having an electrical phase difference of 90° relative to respective ones of the sinusoidal signals. By way of example, the cosinusoidal signals are obtained by using a light-receiving element to detect and photo electrically convert light which has passed through a stationary slit electrically displaced by 90° from the stationary slit for the sinusoidal signals.

Numerals 11 through 14 denote amplifiers for amplifying respective ones of the sinusoidal signals $1\lambda\sin$ through $4096\lambda\sin$, 21 through 24 analog switches for channel selection connected to the output sides of respective ones of the amplifiers 11 through 14, 16 through 19 amplifiers for amplifying the cosinusoidal signals $1\lambda\cos$ through $4096\lambda\cos$, and 26 through 29 analog switches for channel selection connected to the output sides of respective ones of the amplifiers 16 through 19.

Assume now with regard to detecting information relating to the angle of the rotary coding disk that switches 21 and 26 are turned on. In such case, after the sinusoidal signal $4096\lambda\sin$ and cosinusoidal signal $4096\lambda\cos$ from the signal detectors (the corresponding light receiving elements) are amplified by the corresponding amplifiers 11, 16, the amplified signals pass through the switches 21, 26 and enter AD (analog to digital) converters 31, 32, respectively. Each of the AD converters 31, 32 converts its input into digital data of a prescribed number of bits in conformity with the required resolution and supplies this digital data (so-called sine data $X_s$ and cosine data $X_c$) to a ROM 41 as address inputs (e.g., row-and column address inputs). Values obtained by multiplying $\tan^{-1}(X_s/X_c)$ by a suitable constant are converted into binary numbers stored in the ROM 41 in accordance with designated addresses where an address is designated by the sine data $X_s$ and cosine data $X_c$.

More specifically, assume that the input sinusoidal signal $4096\lambda\sin$ is 0.5V and that the cosinusoidal signal $4096\lambda\cos$ is also 0.5V. In such case, these signals are each converted into a prescribed digital quantity, e.g., "0100" by the respective AD converters 31, 32 (i.e., the sine data $X_s$ and cosine data $X_c$ inputted to the ROM 4 are assumed to be "0100"). Accordingly, if such sine data and cosine data are entered as the address signals, the data in the ROM stored at the corresponding address will be a value ($=\frac{1}{8}$) converted into a binary number having a suitable number of bits, e.g., a 10-bit binary number "0010000000", the value ($\frac{1}{8}$) being obtained by multiplying $\tan^{-1}=45°$ by 1/36, which serves as a constant. From among this 10-bit stored data, the four higher-order bits, for example, namely "0010", are read out and latched in a latch circuit 51. In this case, angular information in one wavelength regarding the corresponding channel (i.e., $4096\lambda$) is extracted as interpolated data divided into 16 parts.

Next, the channel selection switches are changed over from 21, 26 to 22, 27, the sinusoidal signal $256\lambda\sin$ and cosinusoidal signal $256\lambda\cos$ which enter at this time are similarly converted into digital data by the AD converters 31, 32, the sine data and cosine data thus obtained are used as address signals for the ROM 41 to again read out 10-bit data corresponding to the address in the manner set forth above, and the data consisting of the four higher-order bits is latched in a latch circuit 52.

Thereafter, and in similar fashion, the channel selection switches are successively changed over to 23, 28 and then to 24, 29, the sine data and cosine data obtained by AD-converting the entering signals $16\sin$, $16\lambda\cos$ and then $1\lambda\sin$, $1\lambda\cos$ are successively used as address signals of the ROM 41 to read out the ROM data corresponding to these addresses, and the four higher-order bits of the read data are successively latched in latch circuits 53, 54.

Thus, the channels (four channels in this case) are successively changed over, and ROM data read out using the two-phase input signals (the sinusoidal and cosinusoidal signals) of each channel as the prescribed address data is successively latched in the latch circuits. By combining the data in the latch circuits 51–54, information indicative of the angle of the rotary coding disk can be detected with 16-bit data using the data (the data on the higher-order bit side) latched in the latch circuit 54 to the data ((the data on the lower-order bit side) latched in the latch circuit 51. In this case, the absolute position of the disk can be detected, with the number of divisions per revolution being $2^{16}$ (i.e., a resolution of $2^{16}$ revolution).

FIG. 3 is a view for describing the absolute position data obtained by the foregoing operation. Let $A_4$ represent a hexadecimal numeric value of the four higher-order bits of interpolated data $D_4$ in the least significant channel (4096λ channel), $A_3$ a hexadecimal numeric value of the four higher-order bits of interpolated data $D_3$ in the 256λ channel, $A_2$ a hexadecimal numeric value of the four higher-order bits of interpolated data $D_2$ in the 16λ channel, and $A_1$ a hexadecimal numeric value of interpolated data $D_1$ in the most significant channel (1λ channel). In such case, the absolute position data is as follows, expressed in hexadecimal notation:

$$A_1 \cdot 16^{-1} + A_2 \cdot 16^{-2} + A_3 \cdot 16^{-3} + A_4 \cdot 16^{-4}$$

It should be noted that if a hexadecimal numeric value $A_i$ (i=1–4) is expressed as follows using binary notation:

$$A_i = a_{i3} \cdot 2^3 + a_{i2} \cdot 2^2 + a_{i1} \cdot 2^1 + a_{i0}$$

then the absolute position data may written as follows:

$$a_{13} \cdot 2^{-1} + a_{12} \cdot 2^{-2} + a_{11} \cdot 2^{-3} + a_{10} \cdot 2^{-4} +$$
$$a_{23} \cdot 2^{-5} + a_{22} \cdot 2^{-6} + a_{21} \cdot 2^{-7} + a_{20} \cdot 2^{-8} + \ldots +$$
$$a_{43} \cdot 2^{-13} + a_{42} \cdot 2^{-14} + a_{41} \cdot 2^{-15} + a_{40} \cdot 2^{-16}$$

Ideally, the sinusoidal signals 1λsin, 16λsin, 256λsin and 4096λsin in the respective channels are required to cross the zero simultaneously at predetermined point in the rotated period, as shown in FIG. 4 (in which only 256λsin and 4096λsin are illustrated). More specifically, (i) with regard to two mutually adjacent channels, sinusoidal signals of the higher-order channel and lower-order channel are required to cross zero simultaneously every 16 cycles of the lower-order channel, and (ii) it is required that the sinusoidal signal and cosinusoidal signal of each channel possess an accurate phase difference of 90° in terms of the electric angle.

However, (i) and (ii) cannot reliably be satisfied at the outset owing to errors in forming the sinusoidal pattern in each channel. That is, as shown in FIG. 5, a phase error $P_E$ resides between the zero cross points of the sinusoidal or cosinusoidal signals of mutually adjacent channels, and the phase between sinusoidal and cosinusoidal signals cannot be made exactly 90°.

Consequently, the conventional practice is to provide means for adjusting, in analog fashion, the phases of the sinusoidal signal and cosinusoidal signal, which are the outputs of the light-emitting elements, use the adjusting means, while observing the sinusoidal signal of each channel using a synchroscope or the like, to effect an adjustment in such a manner that the zero-crossing point of the higher-order channel (the longer period) is made to coincide with the zero-crossing point of the adjacent lower order channel (the shorter period side) at a predetermined point in the rotation period, then similarly advance the phase of the cosinusoidal signal on the longer period to be 90° ahead of the sinusoidal signal, and thereafter perform adjustment in such a manner that the zero-crossing points of the cosinusoidal signals of the mutually adjacent channels coincide.

However, the analog adjustment is troublesome. Moreover, adjustment errors occur, as a result of which absolute position cannot be detected accurately.

SUMMARY OF THE INVENTION

Accordingly, an object of the present invention is to provide an absolute position encoder in which phase can be adjusted digitally, automatically and to.

DISCLOSURE OF THE INVENTION

The present invention provides an absolute position encoder in which sinusoidal and cosinusoidal signals are output in each of a plurality of channels having a numbers of cycles that differ from one another, a prescribed number of items of position information are interpolated in one wavelength of each channel, and m higher-order bits of the interpolated data in each channel are combined to output an absolute position of a rotary coding disk.

In the present invention, corrective data is obtained which will reduce, below a predetermined value, a difference between higher-order n-bit data in the interpolated data in a lower-order channel having a large number of cycles and lower-order n-bit data in the interpolated data in the adjacent higher-order channel having a small number of cycles. The interpolated data of the adjacent higher-order channel is corrected by the corrective data, and the m higher-order bits of the interpolated data of each channel after correction are combined to detect absolute position.

DESCRIPTION OF THE PREFERRED EMBODIMENTS

Described first will be the general features of an angle data correction method used in the absolute position encoder of the present invention.

Figure 2:
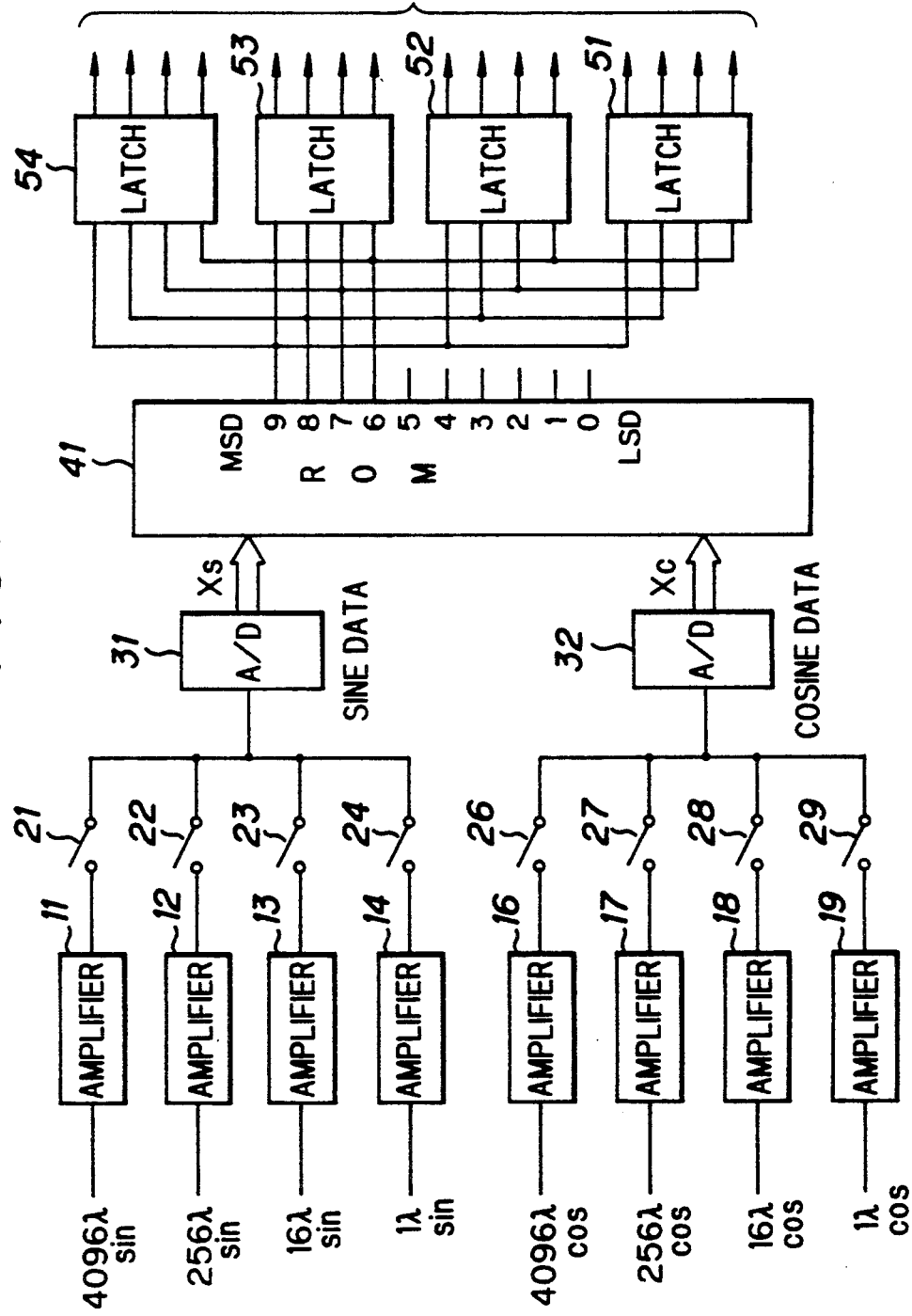
FIG. 2 is a block diagram for describing the principle of absolute position detection performed by an absolute position encoder.
Figure 3:
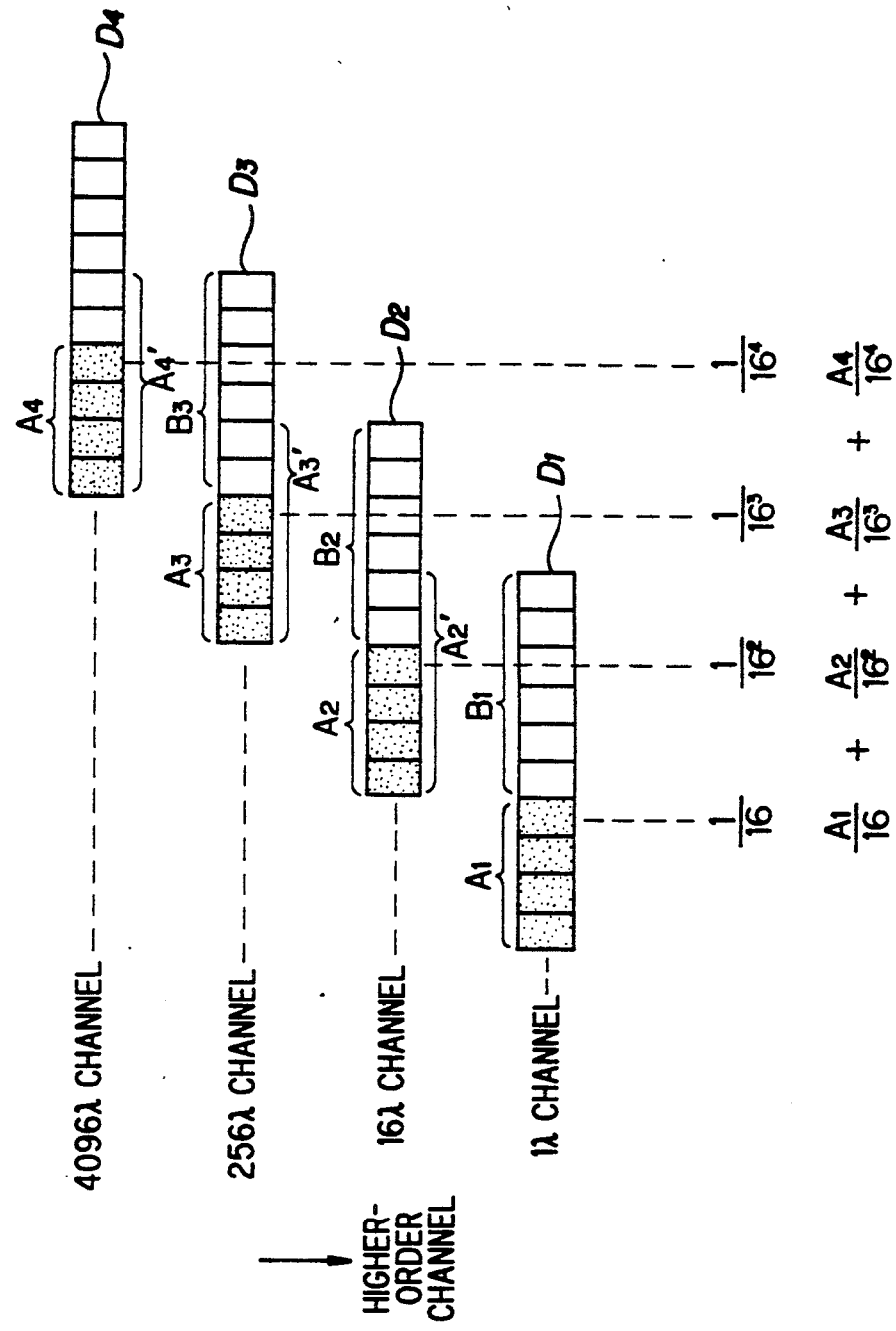
FIG. 3 is a view for describing the structure of absolute position data.
Figure 4:
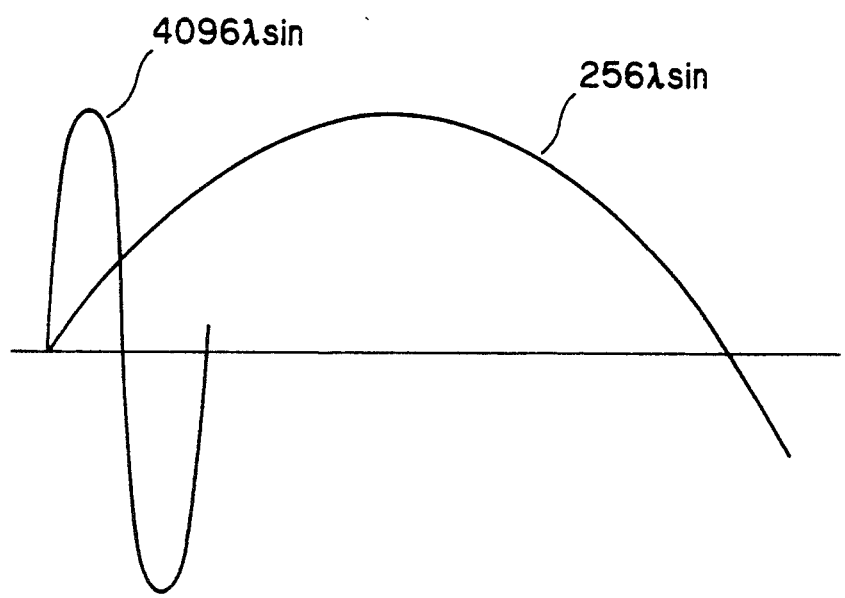
FIGS. 4 and 5 are views for describing the background of the present invention.
Figure 5:
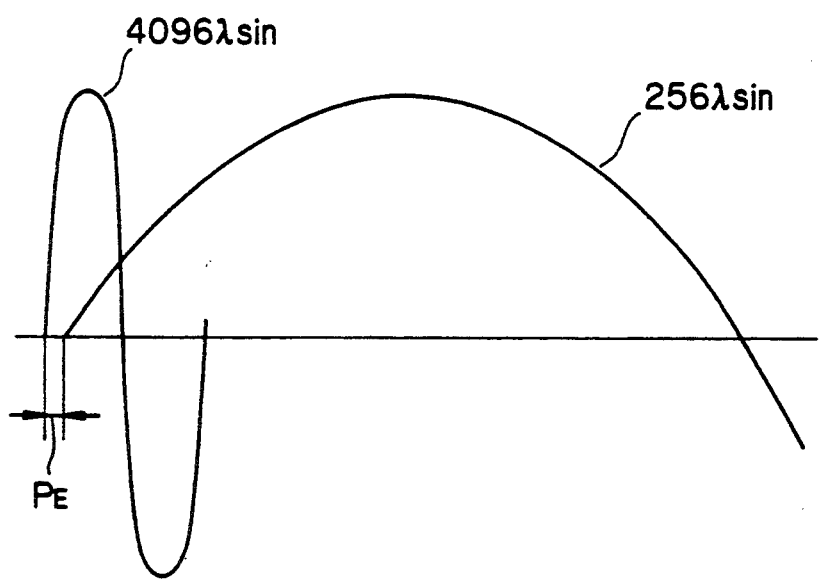

(i) If the zero-crossing points of the sinusoidal signals of two mutually adjacent channels coincide every predetermined number of cycles (e.g., every 16 cycles) of the lower order channel signal and (ii) the phases of the sinusoidal signal and cosinusoidal signal of the same channel are accurately displaced from each other by 90°, then the following will hold with regard to the interpolated data D1–D4 (see FIG. 3) of the respective channels read out of the ROM 41 (FIG. 2):

"Six-bit data $B_i$ starting from the (m+1)th bit (fifth bit) of the higher-order channel of two mutually adjacent channels and higher-order six-bit data $A_{i+1}'$ (i=1, 2, 3) of the lower-order channel will coincide."

In other words, the larger the phase shift of between (i) and (ii), the larger will be the absolute value of the difference between the data $B_i$ and $A_{i+1}'$.

In accordance with the present invention, therefore, (a) an initial value $C_i$ of corrective data is set at zero, and a difference $\Delta C_i$ is computed, at predetermined sampling times, between data $B_i$ in interpolated data $D_i$ of the higher-order channel and data $B_{i+1}'$ in interpolated data $D_{i+1}$ of the lower-order channel;

(b) $C_i + \Delta C_i$ is used as new corrective data ($C_i + \Delta C_i \rightarrow C_i$) if the absolute value of the difference is greater than a set value;

(c) the interpolated data $D_i$ of the higher-order channel at the next sampling time is corrected ($D_i + C_i \rightarrow D_i$) using the corrective data $C_i$, and similar processing is subsequently executed to obtain corrective data which will make the absolute value of the difference $\Delta C_i$ less than a predetermined value;

(d) corrective data is similarly obtained for all mutually adjacent channels; and (e) in detecting the absolute position of a rotary shaft, the interpolated data $D_i$ is corrected by the corrective data $C_i$ and the four higher-order bits of the interpolated data of the respective channels after correction is combined to generate and output data indicative of the absolute position of the rotary shaft.

Figure 1:
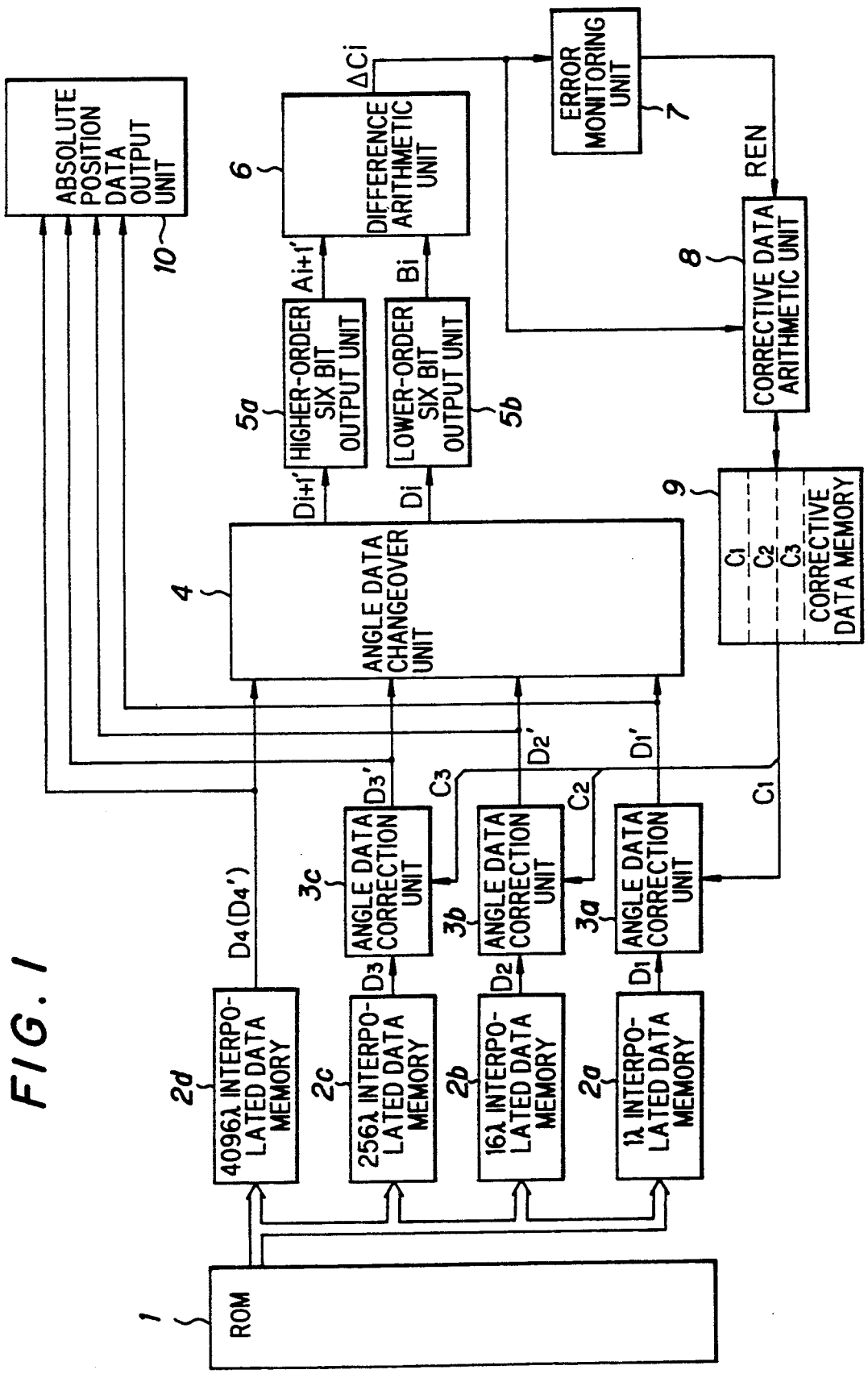
FIG. 1 is a block diagram showing the principal portions of an absolute position encoder according to the present invention.

FIG. 1 is a block diagram showing the principal portions of an absolute position encoder according to the present invention.

Numeral 1 denotes a ROM in which the interpolated data of each channel is stored. This ROM 1 has the same construction as that of ROM 41 shown in FIG. 2 and has the same stored contents. Numerals 2a–2b denote interpolated data memory units which store, at predetermined sampling times, the interpolated data (assumed to be 10-bit data) $D_4$, $D_3$, $D_2$, $D_1$ of the $1\lambda$ through $4096\lambda$ channels read out of the ROM 1. For the details of the interpolated data $D_i$ of each channel, see FIG. 3.

Numerals 3a–3c denote angle data correction units which, based on the corrective data $C_i$ between mutually adjacent channels, corrects the interpolated data $D_i$ of the higher-order channel in accordance with the following equation:

$$D_i + C_i \rightarrow D_i' \ldots \quad (1)$$

Numeral 4 denotes an angle data changeover unit for changing over and outputting the two items of interpolated data $D_i'$, $D_{i+1}'$ of predetermined mutually adjacent channels when the corrective data $C_i$ between each of the mutually adjacent channels is obtained. Numeral 5a designates a higher-order six-bit output unit for outputting higher-order six-bit data $A_{i+1}'$ of the interpolated data $D_{i+1}'$ of the lower-order channel, and 5b designates a lower-order six-bit output unit for outputting lower-order six-bit data $B_i$ of the interpolated data $D_i'$ of the upper-order channel. Numeral 6 denotes a subtracting arithmetic unit for calculating the difference $\Delta C_i$ between data $A_{i+1}'$ and $B_i$ in accordance with the following equation:

$$A_{i+1}' - B_i \rightarrow \Delta C_i \ldots \quad (2)$$

Numeral 7 represents an error monitoring unit for checking to see whether the absolute value $|\Delta C_i|$ of the difference $\Delta C_i$ is less than a set value, 8 a corrective data arithmetic unit, and 9 a corrective data memory unit. The corrective data memory unit 8 updates the corrective data $C_i$ between the mutually adjacent channels in accordance with the following equation:

$$C_i + \Delta C_i \rightarrow C_i \ldots \quad (3)$$

and stores the updated data in the corrective data memory unit 9. Numeral 10 denotes an absolute position data output unit for combining the higher-order four bits $A_1-A_4$ of the interpolated data $D_1'-D_4'$ of respective channels, and for outputting 16-bit binary absolute position data.

The overall operation of FIG. 1 will now be described.

(a) Corrective data decision processing

During corrective data decision processing, the initial values of the corrective data $C_3$, $C_2$, $C_1$ between all of the mutually adjacent channels are set to zero and decisions are made successively starting from the corrective data $C_3$ of the adjacent channel on the side of the least significant channel. The interpolated data $D_1$, $D_2$, $D_3$, $D_4$ of the respective channels is read out of the ROM 1 every predetermined sampling time and stored in the memory units 2a–2d, just as in the conventional method of FIG. 2.

(a) First, on the assumption that the lower-order channel is the $4096\lambda$ channel and the higher-order channel is the $256\lambda$ channel, the corrective operation of Eq. (1) is applied to the interpolated data $D_3$ of the higher-order channel at the predetermined sampling time to generate interpolated data $D_3'$. It should be noted that $D_4$ is regarded as being $D_4'$ without a correction being applied to the interpolated data $D_4$ of the least significant channel.

(b) Next, the angle data changeover unit 4 selects the interpolated data $D_4'$, $D_3'$ of the lower- and higher-order channels after correction and outputs these data to the higher-order six-bit output unit 5a and lower-order six-bit output unit 6a, respectively.

(c) The higher-order six-bit output unit 5a outputs higher-order six-bit data $A_4'$ of the interpolated data $D_4'$ of the lower-order channel, and the lower-order six-bit output unit 5b outputs lower order six-bit data $B_3'$ of the interpolated data $D_3'$ of the higher-order channel.

(d) The difference arithmetic unit 6 calculates the difference $\Delta C_3$ between the data $A_4'$ and data $B_3$ in accordance with Eq. (2) and inputs the difference to the error monitoring unit 7 and corrective data arithmetic unit 8.

(e) The error monitoring unit 7 checks to determine whether the absolute value of the difference $C_3$ is less that the set value, and applies a corrective data update command REN to the corrective data arithmetic unit 8.

(f) When the corrective data update command REN is generated, the corrective data arithmetic unit adopts $C_3 + \Delta C_3$ as new corrective data ($C_3 + \Delta C_3 \rightarrow C_3$) in accordance with Eq. (3) and stores the new corrective data in the corrective data memory unit 9.

Thereafter, when the next sampling time arrives, processing from the aforementioned step (a) is repeated. When the difference $\Delta C_3$ falls below the set value, the corrective data update command REN is not generated and the processing for setting the corrective data $C_3$ is ended.

When the corrective data $C_3$ between the least significant channel and the channel adjacent thereto has been decided by the foregoing operation, the corrective data $C_2$ is subsequently decided using the interpolated data $D_3$, $D_2$ in the same manner, the corrective data $C_1$ is similarly decided using the interpolated data $D_2$, $D_1$, and corrective data decision processing is terminated.

In the foregoing, the corrective data is decided by reading the interpolated data $D_4$–$D_1$ of the respective channels out of the ROM every predetermined sampling time. However, an arrangement can be used in which the foregoing processing is executed to decide the corrective data without altering the interpolated data $D_4$–$D_1$ of the respective channels at the predetermined times.

(b) Absolute position data output processing

In detecting the absolute position of the rotary shaft, the interpolated data $D_1$–$D_3$ in the respective channels is corrected ($D_4$ is not corrected) by the corrective data $C_1$–$C_3$ at the predetermined sampling times, and the interpolated data $D_1'$–$D_4'$ of the respective channels is input to the absolute position data output unit 10. The latter combines the four higher-order bits of the interpolated data $D_1'$–$D_4'$ on the respective channels just as in the prior-art method and outputs absolute position data expressed in the form of a 16-bit binary number.

In the foregoing, it is so arranged that the processing for deciding the corrective data $C_i$ is terminated when $|\Delta C_i|$ falls below the set value in the error monitoring unit 7. It is also permissible to adopt the following arrangement: Specifically, it can be so arranged that the corrective data $C_i$ is updated in accordance with Eq. (3) in a case where the absolute value $|\Delta C_i|$ of the difference is smaller than that which prevailed one sampling instant earlier, whereas if the absolute value is larger than that which prevailed one sampling instant earlier, this value $|\Delta C_i|$ one sampling earlier is regarded as being minimum and corrective data decision processing is terminated. Furthermore, even though the foregoing is a case where the present invention is applied to an optical sensor, it can be applied also to a magnetic sensor.

Further, even though the foregoing describes a rotary-type absolute position encoder, applying the present invention to a linear-type detector such as a linear scale will make it possible to similarly construct a more accurate linear-type absolute position encoder.

Thus, in accordance with the present invention, it is arranged to calculate the difference $\Delta C_i$ between higher-order six-bit data of interpolated data in a lower-order channel and six-bit data starting from a fifth bit of interpolated data in a higher-order channel, obtain corrective data $C_i$ which will bring the difference below a predetermined value or minimize the corrective data, correct the interpolated data in the adjacent higher-order channel by the corrective data $C_i$, and combine the four higher-order bits of the interpolated data of each channel after correction, thereby detecting the absolute position of a rotary shaft. As a result, phase can be adjusted digitally and automatically, and the phase adjustment can be performed so as to minimize adjustment error, thereby making possible high precise detection of absolute position.

I claim:

1. An absolute position encoder for detecting the absolute position of a moving object, comprising:

a moving coding part attached go to the moving object and producing sinusoidal and cosinusoidal outputs in respective channels, in which adjacent channels are made up of a higher-order channel having a small number of cycles and a lower-order channel having a larger number of cycles;

converters for converting the sinusoidal and cosinusoidal outputs in each channel into position information indicative of the position of said moving part;

a ROM connected to said converters in which outputs of the converters corresponding to the sinusoidal and cosinusoidal outputs of the adjacent channels are successively used as address information for an address in said ROM in which a predetermined number of items of position information are interpolated in one wavelength of each channel;

detecting means for detecting an absolute position of the moving coding part using a fixed number (m) of higher-order bits of the interpolated data in each channel;

computing means for computing, based on the absolute position of each of the adjacent channels, corrective data reducing to less than a predetermined value, a difference between a fixed number of higher-order bits of interpolated data in each lower-order channel and a fixed number of bits, starting from an (m+1)th bit, of the interpolated data in each higher-order channel;

correcting means for correcting the interpolated data of the adjacent channels using the corrective data; and combining means for combining m higher-order bits of the interpolated data of each channel after correction to output the absolute position of the moving code part.

2. An absolute position encoder according to claim 1, wherein said computing means obtains the corrective data for each adjacent channel.

3. An absolute position encoder according to claim 2, wherein said computing means comprises:

an arithmetic unit for obtaining the difference between higher-order n-bit data of the interpolated data in the lower-order channel and n-bit data starting from the (m+1) th bit of interpolated data in the higher-order channel;

a monitoring unit, connected to said arithmetic unit, for monitoring whether the difference has fallen below the predetermined value; and a corrective data updating unit, connected to said monitoring unit, for updating the corrective data if the difference has not fallen below the predetermined value.

4. An absolute position encoder according to claim 3, wherein said corrective data updating unit updates the corrective data by applying said difference $\Delta C$ to an initial value C, where the initial value C of the corrective data is assumed to be zero and said difference is assumed to be $\Delta C$, and updates the corrective data until the absolute value of $\Delta C$ falls below the predetermined value.

5. An absolute position encoder according to claim 1, wherein said moving coding part is a rotary coding disk, the number of cycles of the sinusoidal and cosinusoidal outputs of the respective channels are $16^0$, $16^1$, $16^2$, $16^3$ . . . per revolution, and the fixed (m) number of higher-order bits of interpolated data in each channel is 4.

6. An absolute position encoder according to claim 1, wherein said moving coding part is a rotary coding disk for detecting the rotational position of a rotating object.

7. An absolute position encoder according to claim 6, further comprising:
   a light-receiving element capable of converting light to an electrical signal; and
   stationary slits comprising:
      a first stationary slit through which light that passes is converted to a sinusoidal signal; and
      a second stationary slit, electrically displaced 90° from the first stationary slit, so that light that passes through the second stationary slit is converted to a cosinusoidal signal.

8. A correction device for correcting an output of an absolute position encoder capable of providing digital signals, comprising:
   storing means for storing digital data provided by each digital signal at a precision that produces overlapping bits;
   comparison means for comparing the overlapping bits and obtaining corrective data;
   correction means for correcting the digital data stored in said storing means using the corrective data obtained by said comparison means said storing means comprising a read only memory;
   said comparison means comprising a difference arithmetic unit computing a difference between the overlapping bits in the digital data, a corrective data updating unit updating the corrective data based on the difference and a corrective data memory storing the corrective data; and
   said correction means comprising a digital data correction unit, inputs of which are connected to said corrective data memory and said read only memory and outputs of which are connected to said difference arithmetic unit.

9. A correction device for correcting an output of an absolute position encoder capable of providing digital signals, comprising:
   storing means for storing digital data provided by each digital signal at a precision that produces overlapping bits;
   comparison means for comparing the overlapping bits and obtaining corrective data;
   correction means for correcting the digital data stored in said storing means using the corrective data obtained by said comparison means
   said storing means comprising a read only memory; and
   said comparison means comprising a difference arithmetic unit computing a difference between the overlapping bits in the digital data, a corrective data memory, connected to said difference arithmetic unit and storing the difference, and an angle data correction unit, connected to said corrective data memory, said read only memory and said difference arithmetic unit, and applying the difference to a comparison of the overlapping bits of digital data for different digital signals.

10. A correction device for correcting an output of an absolute position encoder capable of providing digital signals, wherein the digital signals have been converted from sinusoidal and cosinusoidal signals of different frequency output by the absolute position encoder, comprising:
    storing means for storing digital data provided by each digital signal at a precision that produces overlapping bits;
    comparison means for comparing the overlapping bits and obtaining corrective data;
    correction means for correcting the digital data stored in said storing means using the corrective data obtained by said comparison means, and reducing a phase error between the sinusoidal and cosinusoidal signals of different frequency;
    said storing means comprising a read only memory; and
    said comparison means comprising a difference arithmetic unit computing a difference between the overlapping bits in the digital data, a corrective data memory, connected to said difference arithmetic unit and storing the difference, and an angle data correction unit, connected to said corrective data memory, said read only memory and said difference arithmetic unit, and applying the difference to a comparison of the overlapping bits of digital data for different digital signals.

11. A method of correcting the output of an absolute position encoder capable of providing digital signals converted from sinusoidal and cosinusoidal signals of different frequency output by the absolute position encoder, comprising the steps of:
    (a) storing digital data provided by each digital signal at a precision that produces overlapping bits;
    (b) comparing the overlapping bits to obtain corrective data; and
    (c) correcting the digital data stored by said storing in step (a) using the corrective data obtained by said comparing in step (b) to reduce a phase error between the sinusoidal and cosinusoidal signals of different frequency.

* * * * *